(12) United States Patent
Huang

(10) Patent No.: US 11,316,157 B1
(45) Date of Patent: Apr. 26, 2022

(54) METHODS FOR THE PRODUCTION OF CATHODE MATERIALS FOR LITHIUM ION BATTERIES

(71) Applicant: Ge Solartech, LLC, Troy, MI (US)

(72) Inventor: Baoquan Huang, Troy, MI (US)

(73) Assignee: Ge Solartech, LLC, Troy, MI (US)

( * ) Notice: Subject to any disclaimer, the term of this patent is extended or adjusted under 35 U.S.C. 154(b) by 251 days.

(21) Appl. No.: 16/416,236

(22) Filed: May 19, 2019

Related U.S. Application Data

(60) Provisional application No. 62/676,937, filed on May 26, 2018.

(51) Int. Cl.
| | | |
|---|---|---|
| H01M 4/505 | (2010.01) | |
| H01M 4/485 | (2010.01) | |
| H01M 4/525 | (2010.01) | |
| H01M 10/0525 | (2010.01) | |
| C01D 15/02 | (2006.01) | |

(52) U.S. Cl.
CPC ............ *H01M 4/505* (2013.01); *C01D 15/02* (2013.01); *H01M 4/485* (2013.01); *H01M 4/525* (2013.01); *H01M 10/0525* (2013.01)

(58) Field of Classification Search
CPC ...... H01M 4/505; H01M 4/485; H01M 4/525; H01M 10/0525; C01D 15/02
See application file for complete search history.

(56) References Cited

U.S. PATENT DOCUMENTS

| | | | |
|---|---|---|---|
| 6,660,432 B2 | 12/2003 | Paulsen | |
| 6,677,082 B2 | 1/2004 | Thackeray | |
| 7,078,128 B2 | 7/2006 | Lu | |
| 7,488,465 B2 | 2/2009 | Eberman | |
| 8,241,791 B2 | 8/2012 | Lu | |
| 2010/0248033 A1* | 9/2010 | Kumar | H01M 4/525 429/223 |
| 2014/0272132 A1* | 9/2014 | Frianeza-Kullberg | C01D 15/00 427/215 |

OTHER PUBLICATIONS

S. Hildebrandt, A. Eva, P. Komissinskiy, C. Fasel, I. Fritsch, L. Aiff. Sol-gel synthesis of sodium and lithium based materials, J. Sol.-Gel. Sci. Technol. (2012) 63:307-314.*

D. Deivamani, P. Perumal, A. S. Enigo Chitra, and M. Boomashri. Synthesis and Characterization of Zn Doped LiNi0.3 Mn0.3Co0.3O2 As Cathode Materials For Li-Ion Battery, Int. J. Chem. Sci.: 14(1), 2016, 496-502.*

\* cited by examiner

*Primary Examiner* — Carlos Barcena
(74) *Attorney, Agent, or Firm* — Kevin L. Bray

(57) ABSTRACT

The present disclosure provides methods for producing cathode materials for lithium ion batteries. Cathode materials that contain manganese are emphasized. Representative materials include $Li_xNi_{1-y-z}Mn_yCo_zO_2$ (NMC) (where x is in the range from 0.80 to 1.3, y is in the range from 0.01 to 0.5, and z is in the range from 0.01 to 0.5), $Li_xMn_2O_4$(LM), and $Li_xNi_{1-y}Mn_yO_2$ (LMN) (where x is in the range from 0.8 to 1.3 and y is in the range from 0.0 to 0.8). The process includes reactions of carboxylate precursors of nickel, manganese, and/or cobalt and lithiation with a lithium precursor. The carboxylate precursors are made from reactions of pure metals or metal compounds with carboxylic acids. The manganese precursor contains bivalent manganese and the process controls the oxidation state of manganese to avoid formation of higher oxidation states of manganese.

18 Claims, 12 Drawing Sheets

METHODS FOR THE PRODUCTION OF CATHODE MATERIALS FOR LITHIUM ION BATTERIES

GOVERNMENT RIGHTS

This invention was made with government support under Contract DE-SC0017761 awarded by the Department of Energy. The government has certain rights in the invention.

FIELD

The present disclosure relates to cathode materials for lithium ion batteries. More particularly, the present disclosure relates to methods for producing transition metal oxide materials. Most particularly, the present disclosure relates to methods for preparing oxide materials with layers of lithium that alternate with layers of oxides of nickel, manganese, and/or cobalt ("NMC"), or nickel and manganese without cobalt ("NM"), or nickel, manganese and/or cobalt and/or other elements. The materials feature a controlled degree of mixing of transition metal cations in the lithium layers and minimization of the presence of $Mn^{4+}$ and higher oxidation states of manganese during the synthesis.

BACKGROUND

Electric vehicles (EVs) represent safe, quick, quiet, robust and environmentally desirable means of transportation among most commuters. However, they account for a tiny fraction of automotive sales, mainly because the batteries are expensive and need to be recharged frequently. In order to meet the United States Advanced Battery Consortium (US-ABC) goals for advanced batteries for EV and facilitate more rapid market penetration of EV, the technology requires a significantly reduced battery cost and increased material performance.

Lithium ion batteries (LIBs) are rechargeable batteries that generate electrical current when lithium ions shuttle to and fro between a pair of electrodes. $LiNi_{1-x-y}Mn_xCo_yO_2$ (NMC) and $LiNi_{1-x}Mn_xO_2$ (LNM) with layered structures, and $Li_xMn_2O_4$(LM) and $Li_xMn_{2-y}Ni_yO_4$ (LMN) with spinel structures, have been the major cathode materials, while graphite has been the typical anode material. The lithium cathode materials are responsible for about 40% of the cost of the battery. The current manufacturing cost of NMC materials is high due to the use of conventional hydroxide co-precipitation method of synthesis. This multi-step process is complicated and expensive.

Many difficult problems have been encountered in developing next generation battery materials—in part due to an incomplete understanding of reaction mechanisms. For example, the simple and low-cost solid-state synthesis process has worked well for the industrial production of $LiCoO_2$ (LCO) and $LiNi_{0.8}Co_{0.15}Al_{0.05}O_2$ (NCA), but has not yet been employed in mass production of the NMC materials. Here we briefly discuss the differences between the two materials based on their chemistry and structure.

Although $LiCoO_2$ has high power performance, it delivers a low 140 mA-hr/g of storage capacity because only about half of the Li atoms are utilized. Both $LiNiO_2$ and $LiMnO_2$ have the same layered structure as $LiCoO_2$. $LiNiO_2$ has high reversible capacity, but suffers from poor cycle stability and low rate. In $LiMnO_2$, a larger amount of Li atoms are able to reversibly deintercalate/intercalate to the structure. However, during cycling, the layered structure $LiMnO_2$ tends to transform to the cubic spinel structure $LiMn_2O_4$, leading to significant capacity loss. A multiple cation layered structure phase, i.e., $LiNi_{1-x-y}Mn_xCo_yO_2$(NMC), could provide the advantages of each of the pure cation phases while overcoming many of the drawbacks.

In addition to crystal structure, the performance of cathode materials for lithium batteries depends on morphology. Reducing the particle size is critical to improving the rate performance by shortening the lithium diffusion distance and enlarging the contact area with the electrolyte. The use of nanostructures is an effective way to improve the kinetics of lithium ion transport and enhance the electrochemical performance of the cathode material. Layered NMC nanostructures with different morphologies, such as nanorods, porous nanorods, nanoparticles, microspheres, hollow microspheres, and microcubes, are interesting because they display high performance. These nanostructured materials can be synthesized by various methods, such as hydroxide co-precipitation, carbonate co-precipitation, combustion, solid state reaction and spray-drying methods.

Known solid state reaction methods for the production of NMC cathodes include reacting a mixture of cobalt-, manganese-, nickel- and lithium-containing oxides or oxide precursors (such as the process described in U.S. Pat. No. 7,488,465 by Eberman, entitled "Solid state synthesis of lithium ion battery cathode material"). This production process is less efficient and high cost because it uses expensive transition metal precursors as the starting materials. The production of the solid state precursors is a complicated, multistep process, which consumes a significant amount of chemicals and energy. Furthermore, this conventional solid state process is difficult to control.

SUMMARY

The disclosure presents methods for the production of cathode materials for lithium ion batteries. Manganese-containing cathode materials, such as NMC ($LiNi_{1-x-y}Mn_xCo_yO_2$), LM ($Li_xMn_2O_4$) and LNM ($Li_xNi_{1-y}Mn_yO_2$), are emphasized. These cathode materials feature high energy density. The process comprises reacting a mixture of nickel, manganese, cobalt, and/or lithium precursors and calcining to form an oxide.

The precursors for nickel, manganese, and cobalt are carboxylates. Preferred carboxylates are acetates and citrates. Precursors for lithium include lithium hydroxide and lithium carbonate.

The metal carboxylate precursors are prepared from metal starting materials that enable a reduction in the cost of production of the cathode materials. Metal starting materials include pure metals and metal compounds. Metal compounds include oxides, hydroxides, and carbonates.

The metal carboxylate precursors are prepared by reacting a metal starting material with a carboxylic acid. Reactions include liquid phase reactions and solid state reactions. Liquid phase reactions include mixing a metal starting material with a liquid carboxylic acid or a solution containing a carboxylic acid. Solid phase reactions include grinding a metal starting material in the presence of a carboxylic acid. Mixed metal precursors are prepared by including two or more metal starting materials in the reaction.

Metal carboxylate precursors are reacted to form an oxide material. Reactions for forming the oxide material include liquid phase reactions and solid state reactions. In liquid phase reactions, liquid phase metal carboxylate precursors are combined, stirred and heated to form a slurry. The slurry is dried, ball milled, and calcined to form a metal oxide. A lithium precursor can be included in the slurry before drying or added to the slurry after drying, but before ball milling. Solid phase reactions include ball milling solid phase metal carboxylate precursors in the presence of a lithium precursor and then calcining to form a metal oxide. Metal carboxylate precursors with one or a combination of two or more metals are used in the liquid or solid phase reactions.

The present disclosure extends to:
A method for forming an oxide material comprising:
reacting a first precursor with a second precursor, the said first precursor comprising a first compound, said first compound including a first metal bonded to a first carboxylate group and a second carboxylate group, the said second precursor including a second compound, said second compound including a second metal bonded to a third carboxylate group.

The present disclosure extends to:
A method of making a carboxylate compound comprising:
reacting a first pure metal with a first carboxylic acid in the presence of an inorganic acid.

The present disclosure extends to:
A method of making a carboxylate compound comprising:
reacting a first metal compound with a first carboxylic acid, said reacting including ball milling a mixture of said first metal compound and said first carboxylic acid.

The present disclosure extends to:
A method for forming an oxide material comprising:
reacting a first precursor with a second precursor, said first precursor comprising a first compound and a second compound, said first compound including a first metal bonded to a first carboxylate group and said second compound including said first metal bonded to a second carboxylate group, said second precursor comprising a third compound, said third compound including a second metal bonded to a third carboxylate group.

The present disclosure also provides a method for directly recycling and regenerating manganese-containing NMC, LMO and LMN cathodes from waste lithium ion batteries, avoiding a complex separation process.

DETAILED DESCRIPTION OF THE ILLUSTRATED EMBODIMENTS

Figure 1:
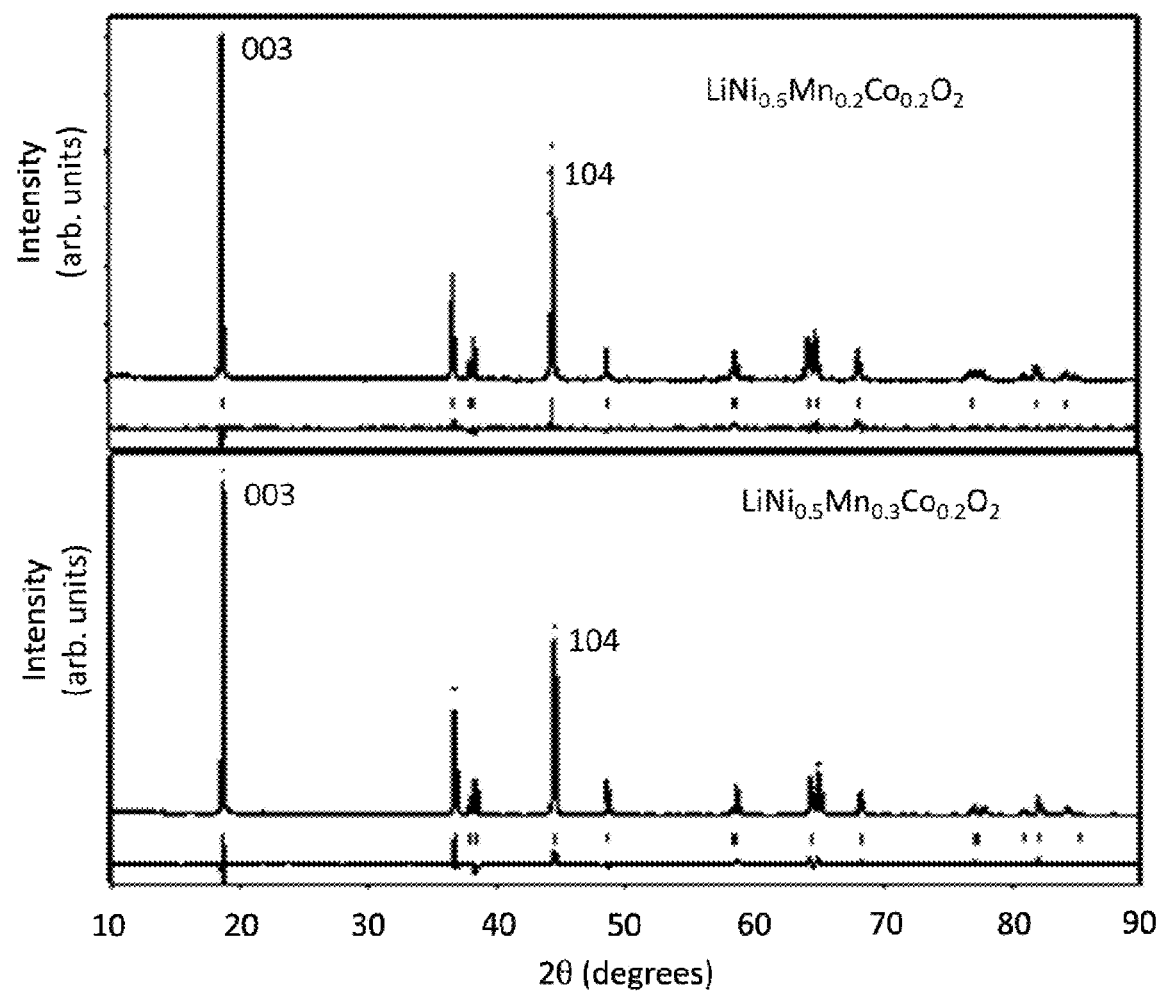
FIG. 1 shows XRD (X-ray diffraction) Rietveld refinement patterns of samples of $LiNi_{0.5}Mn_{0.3}Co_{0.2}O_2$ and $LiNi_{0.6}Mn_{0.2}Co_{0.2}O_2$.

The instant disclosure provides a process for producing cathode materials for lithium ion batteries. The cathode materials contain manganese (Mn) and are produced in high yield at low cost. Representative cathode materials include NMC ($LiNi_{1-x-y}Mn_xCo_yO_2$), LM ($Li_xMn_2O_4$), and LNM ($Li_xNi_{1-y}Mn_yO_2$). The prevailing commercial process for producing NMC cathodes is the hydroxide co-precipitation process. In the state-of-the-art industrial production method, ammonium ion is added to a solution of sulfates of nickel, manganese, and cobalt. Nickel, manganese, and cobalt cations form complex ions with ammonia. Caustic is then added to induce decomposition of the transition metal ammonium complexes and gradual precipitation of the hydroxide of NMC. Current processes for the production of the transition metal sulfates starting materials ($MSO_4$) involve dissolving expensive, high grade, and highly pure primary nickel, manganese and cobalt powders in sulfuric acid ($H_2SO_4$). The hydroxide co-precipitation method can produce high-density microspheres that are made of primary crystalline nano-platelets.

The NMC hydroxide is lithiated at about 930° C. in the presence of $Li_2CO_3$. In the course of lithiation, two protons per formula unit of the NMC hydroxide are replaced by one lithium cation and the transition metal cations are oxidized from bivalent (+2) to trivalent (+3). The structure change from the NMC hydroxide to the lithiated material is very small so that the microsphere morphology remains after calcination.

Although the lithiation process is short (usually 2-3 hours), there exists a trace amount of a higher oxidation state manganese compound, $Li_2MnO_3$. This compound does not contribute to reversible storage unless the voltage is raised to over 4.5 V. In the Li—Mn—O system, $Li_2MnO_3$ is more stable than $LiMnO_2$ in air at high temperatures. A metastable phase $LiMnO_2$ can be synthesized only from lower oxidation state manganese compounds, such as $Mn(OH)_2$ and $MnCO_3$. This is why NMC cathodes cannot be made by the reaction of their corresponding oxides. Formation of $Li_2MnO_3$ depletes the lithium content in the main NMC phase, and leads to low storage capacity. In order to obtain a high storage capacity, a slight excess of lithium is added to compensate for loss due to the formation of the $Li_2MnO_3$ phase. It would be desirable to develop a process for making NMC cathode materials that avoids formation of the $Li_2MnO_3$ phase.

The materials obtained by the hydroxide co-precipitation method have a highly ordered structure (low cation mixing) and are of relatively high performance in rate capacity and kinetics. However, the cathodes produced by this method cannot give a high reversible capacity because nearly 50% Li cations remain in the Li layer to stabilize the crystal structure.

With an identical layered structure, the chemical properties of $LiMO_2$ (M=Ni, Co, Mn) and, in particular, their transport of lithium ions through intercalation and de-intercalation processes are quite different. In $LiMnO_2$, most lithium ions can be de-intercalated because $Mn^{4+}$ is quite stable in the binary oxide $MnO_2$. However, the layered structure of $LiMnO_2$ tends to change to the spinel structure after most of the lithium ions are de-intercalated. The reason is that the layered structure of $MnO_2$ is unstable since Van der Waals interactions of oxygen anions between layers are too weak to hold the structure together without Li ions. Spinel $MnO_2$ is a three-dimensional and stable structure because the $Mn^{4+}$ ions occupy the sites of oxygen anions alternately. In $LiCoO_2$, only half of the lithium ions can be de-intercalated; the other half of lithium ions remain to stabilize the layered structure.

Compared with $LiMnO_2$ and $LiCoO_2$, the Ni—O bond strength in $LiNiO_2$ is relatively weak, especially at high temperatures. In Ni compounds, Ni atoms have two oxidation states, i.e., $Ni^{3+}$ and $Ni^{2+}$. The $Ni^{2+}$ ions have a similar size to $Li^+$ ($r_{Ni}^{3+}=0.056$ nm, $r_{Ni}^{2+}=0.068$ nm, $r_{Li}^+=0.074$ nm), and situate in the $Li^+$ ion layers, blocking the path way of $Li^+$ transport. This is why $LiNiO_2$ suffers from poor performance at high rate.

In Ni-rich materials, a replacement of a small amount of Li by Ni in the lithium layers (weak cation mixing) gives larger reversible capacity because excess Ni stabilizes the structure by forming bonds between $NiO_2$ slabs. As a result, a much higher fraction of Li ions are able to undergo reversible intercalation/de-intercalation. However, Ni atoms in the Li layer can block the passage of $Li^+$ transport, leading to poor performance in rate capacity. Therefore, $Ni^{2+}$ cations in lithium layers should be controlled within a certain range in order to obtain higher performance.

The term "cation mixing" is used herein to refer to the degree to which transition metal ions enter the lithium layers of NMC, LM, LNM, and other transition metal oxide cathode materials. A high degree of cation mixing indicates substantial substitution of transition metal ions in the lithium layers and greater inhibition of lithium ion transport. A low degree of cation mixing indicates little substitution of transition metal ion layers and a decrease in the fraction of lithium ions available for ion transport due to utilization of a greater fraction of lithium ions to stabilize the structure. Cation mixing, expressed as an occupancy factor of Ni on the Li site, can be determined by X-ray diffraction Rietveld profile refinements. The amount of Ni cations within the Li layers depends on the synthesis conditions.

In order to tailor the degree of cation mixing, there is a need for a new synthetic protocol. The synthesis methods disclosed herein enable the control of the amount of cation mixing by programming reaction conditions. The conditions, such as precursors, duration of ball milling, reaction temperatures and oxygen environments, are crucial in determining crystalline phases, morphology, and cation mixing that influence the electrochemical performance of the NMC, LM, LNM, and related cathode materials.

The disclosure presents methods for the production of cathode materials for lithium ion batteries. Manganese-containing cathode materials, such as NMC ($LiNi_{1-x-y}Mn_xCo_yO_2$), LM ($Li_xMn_2O_4$) and LNM ($Li_xNi_{1-y}Mn_yO_2$), are emphasized. These cathode materials feature high energy density. The method can also be used generally for transition metal oxide materials. The process comprises reacting a mixture of nickel, manganese, cobalt, and/or lithium precursors and calcining to form an oxide.

The precursors for nickel, manganese, and cobalt are carboxylates. Preferred carboxylates are acetates and citrates. Other carboxylates include formate, propionate, oxalate, malonate, isocitrate and acontitate. Carboxylates bonded to a given metal or to multiple metals used in the preparations described herein are the same in some embodiments and differ in other embodiments. Precursors for lithium include lithium hydroxide and lithium carbonate.

The metal carboxylate precursors are prepared from metal starting materials that enable a reduction in the cost of production of the cathode materials. Metal starting materials include pure metals and metal compounds. Preferred starting materials are pure metals. As used herein, "pure metal" refers to a starting material in which the metal is present in an elemental or zero valent state. The pure metals can be in various physical forms (powder, flakes, particulate, nanoparticle, sheet etc.) and can be used directly without further treatment to produce metal carboxylate precursors that are subsequently reacted to form a cathode material. Metal compounds include a metal in an oxidized state (cation). Representative metal compounds include metal oxides, metal hydroxides, and metal carbonates.

The metal carboxylate precursors are prepared by reacting a metal starting material with a carboxylic acid. Reactions include liquid phase reactions and solid state reactions. Liquid phase reactions include mixing a metal starting material with a liquid carboxylic acid or a solution containing a carboxylic acid. Solid phase reactions include grinding a metal starting material in the presence of a carboxylic acid. Mixed metal precursors are prepared by including two or more metal starting materials in the reaction.

Carboxylate ligands in the metal carboxylate precursors include monodentate and multidentate carboxylate ligands. Monodentate carboxylate ligands have a single carboxylate functional group and bond to a single metal cation. Multidentate carboxylate ligands have two or more carboxylate functional groups. Multidentate carboxylate ligands can bond with a particular metal cation at two or more bonding sites and/or can bond with two or more different metal cations. Multidentate carboxylate ligands include chelating carboxylate ligands. Acetate is an example of a monodentate carboxylate and citrate is an example of a multidentate carboxylate.

Metal carboxylate precursors are reacted to form an oxide material. Reactions for forming the oxide material include liquid phase reactions and solid state reactions. In liquid phase reactions, liquid phase metal carboxylate precursors are combined, stirred and heated to form a slurry. The slurry is dried, ball milled, and calcined to form a metal oxide. A lithium precursor can be included in the slurry before drying or added to the slurry after drying, but before ball milling. Solid phase reactions include ball milling solid phase metal carboxylate precursors in the presence of a lithium precursor and then calcining to form a metal oxide. Metal carboxylate precursors with one or a combination of two or more metals are used in the liquid or solid phase reactions.

In one aspect, the process utilizes manganese precursors with bivalent manganese ($Mn^{2+}$) and provides conditions that prevent manganese from oxidizing to higher oxidation states. The formation of byproducts, such as $Li_2MnO_3$, in which manganese is in a high oxidation state is inhibited.

In one aspect, the process uses pure metals as starting materials for metal precursors. Pure metals are advantageous starting materials because they are much less expensive than the metal sulfates used in the hydroxide co-precipitation process and can be used without purification or preliminary processing. The time, complexity, and energy consumption encountered in the hydroxide co-precipitation process are avoided.

The process further provides a method to tailor the degree of cation mixing through systematic control of reaction conditions. Reaction conditions, such as precursor selection, duration of ball milling, reaction temperatures and oxygen environments, are crucial in determining the crystalline phases, product compounds, and cation mixing that influence the electrochemical performance of NMC, LM, LNM, and other oxide electrodes. The present process provides great control over the structure, composition, and oxidation states of transition metal oxide cathode materials.

Precursor Preparation

Manganese Precursors. The manganese precursors are critical to solid-state synthesis of NMC materials because the oxidation state of manganese needs to be low (bivalent) to prevent formation of more highly oxidized phases that reduce storage capacity. Carboxylate precursors are advantageous to the formation of the NMC and other metal oxide materials because the calcination process leads to evolution of reducing gases that act to prevent oxidation of manganese. Manganese carboxylates, such as manganese citrate and manganese acetate, are preferred precursors.

To prepare manganese citrate, manganese flakes and citric acid are used as the starting materials. Manganese flakes are crushed to small pieces and mixed with citric acid powder; then water is gradually added at room temperature or elevated temperatures (typically 20° C.-85° C.). The governing reaction is:

$$3Mn + 2C_3H_5O(COOH)_3 \rightarrow Mn_3[C_3H_5O(COO)_3]_2 + 3H_2 \quad (1)$$

The resulting product is a slurry that can be used directly as a metal precursor for manganese-containing oxide material as described below. Alternatively, the slurry can be dried and used as a metal precursor.

To prepare manganese acetate, manganese flakes and acetic acid are used as the starting materials. Crushed manganese flakes are loaded in a mixer, and concentrated acetic acid is gradually added during mixing. Mixing can occur at room temperature or elevated temperature. The governing reaction is:

$$Mn + 2CH_3(COOH) \rightarrow Mn[CH_3(COO)]_2 + H_2 \quad (2)$$

The resulting product is a slurry. The slurry can be used directly or in dried form as a metal precursor for the synthesis of manganese-containing metal oxide cathode materials.

Cobalt Precursors. Direct reaction of cobalt metal with citric acid or acetic acid proceeds relatively slowly. In the presence of an inorganic acid, however, cobalt metal reacts more readily with citric acid or acetic acid to produce cobalt citrate or cobalt acetate. As used herein, the term inorganic acid refers to an acid that lacks carbon. Representative inorganic acids include $HNO_3$, $HCl$, $H_2SO_4$, and $HClO_4$. When nitric acid is used, the reactions are:

$$3Co + 2C_3H_5O(COOH)_3/(HNO_3) \rightarrow Co_3[C_3H_5O(COO)_3]_2/[Co(NO_3)_2] + 3H_2 \quad (3)$$

$$Co + 2CH_3(COOH)/(HNO_3) \rightarrow Co[CH_3(COO)]_2/[Co(NO_3)_2] + H_2 \quad (4)$$

The slurry product is used directly or in dried form as a metal precursor for cobalt-containing metal oxide materials The compound starting material cobalt oxide reacts with citric acid or acetic acid to form cobalt citrate or acetate according to the following reactions:

$$3CoO + 2C_3H_5O(COOH)_3 \rightarrow Co_3[C_3H_5O(COO)_3]_2 + 3H_2O \quad (5)$$

$$CoO + 2CH_3(COOH) \rightarrow Co[CH_3(COO)]_2 + H_2O \quad (6)$$

The kinetics of the reaction of cobalt oxide with carboxylic acids is slow because of the stability of cobalt oxides. Ball milling aids the kinetics by reducing the particle size of cobalt oxide starting materials and increasing mixing efficiency. Shorter reaction times result.

Other cobalt compound starting materials for cobalt metal precursors include $Co_3O_4$, $CoO$, $CoCO_3$, and $Co(OH)_2$.

Nickel Precursors. Nickel metal reacts weakly with carboxylic acids. In the presence of an inorganic acid, however, nickel metal reacts more readily with citric acid or acetic acid to produce nickel citrate or nickel acetate. When nitric acid is used, the reactions of nickel metal with citric acid and acetic acid to form nickel citrate and nickel acetate are:

$$3Ni + 2C_3H_5O(COOH)_3/(HNO_3) \rightarrow Ni_3[C_3H_5O(COO)_3]_2/[Ni(NO_3)_2] + 3H_2 \quad (7)$$

$$Ni + 2CH_3(COOH)/(HNO_3) \rightarrow Ni[CH_3(COO)]_2/[Ni(NO_3)_2] + H_2 \quad (8)$$

Oxides and other compounds of nickel can also be used as starting materials for nickel precursors. The reactions of citric acid and acetic acid with nickel oxide are:

$$3NiO + 2C_3H_5O(COOH)_3 \rightarrow Ni_3[C_3H_5O(COO)_3]_2 + 3H_2O \quad (9)$$

$$NiO + 2CH_3(COOH) \rightarrow Ni[CH_3(COO)]_2 + H_2O \quad (10)$$

Other nickel compound starting materials include $Ni(OH)_2$, $NiCO_3$, and $Ni_{1-x}O$. Ball milling will facilitate the kinetics of reactions of nickel compounds with carboxylic acids to shorten the reaction time.

Mixed Precursors. Mixed precursors include precursors that contain two or more metals and/or two or more carboxylate groups. A pure metal or a metal compound, for example, can be reacted with two or more carboxylic acids (e.g. a combination of citric acid and acetic acid) to form a mixed precursor. Similarly, two or more metal starting materials (pure metals or metal compounds) (e.g. pure metals or compounds of Ni and Co, Ni and Mn, or Co and Mn) can react with a carboxylic acid (e.g. citric acid or acetic acid) to form a mixed precursor. Also, two or more metal starting materials (pure metals or metal compounds) can react with two or more carboxylic acids (e.g. citric acid and acetic acid) to form a mixed precursor.

In one aspect, a mixed precursor includes a compound that contains two or more different metals (e.g. an acetate compound that includes Ni and Co). In another aspect, a mixed precursor includes a compound that contains two or more different carboxylate groups (e.g. a nickel compound that includes acetate and citrate groups). In still another aspect, a mixed precursor includes a compound that contains two or more different metals and two or more different carboxylate groups (e.g. a compound that contains nickel and cobalt along with citrate and acetate). In further aspects, the mixed precursor includes two or more compounds, where the number and/or type of metal and/or carboxylate group differs in the different compounds.

Reaction of solid phase metal precursors to form metal oxides is a potentially facile and low-cost manufacturing technology that has been successfully applied to industrial production of many metal oxides. The technology is especially applicable to the production of metal oxides having constituent metals with stable oxidation states at the elevated temperatures typically used for solid state synthesis. $LiCoO_2$, for example, has a stable +3 oxidation state for Co at high temperature and can be readily produced in a solid state reaction from solid phase cobalt precursors. Single phase $LiCoO_2$ with a layered structure can form high-density nanocrystals. Many technical challenges, however, have remained in the preparation of manganese-containing oxide materials by solid-state reactions. Manganese is a difficult metal constituent to control because manganese (1) readily transforms between any of multiple oxidation states, (2)

tends to form of multiple crystalline phases that differ in stoichiometry, (3) is highly sensitive to reaction conditions, and (4) frequently leads to non-uniform reaction products. Due to a limited understanding of the reaction chemistry of manganese, solid-state reaction technology has not yet been effectively utilized to produce NMC and other manganese-containing oxide materials. Examples described herein demonstrate that NMC materials can be successfully produced by using a solid-state process when the manganese precursors described herein are used in the reaction.

Preparation of Transition Metal Oxides

Various reaction schemes for preparing transition metal oxides from the metal precursors described herein are described below. Transition metal oxides that can be prepared using the methods described herein include $Li_xNi_{1-y-z}Mn_yCo_zO_2$(NMC) (where x is in the range from 0.80 to 1.3, y is in the range from 0.01 to 0.5, and z is in the range from 0.01 to 0.5), $Li_xMn_2O_4$(LM), and $Li_xNi_{1-y}Mn_yO_2$ (LNM) (where x is in the range from 0.8 to 1.3 and y is in the range from 0.0 to 0.8). Although not explicitly listed, other transition metal oxide compositions can be similarly prepared using the methods disclosed herein.

The reaction schemes and examples described below will emphasize NMC as an illustrative transition metal oxide material. Analogous schemes for transition metal oxides in general are readily recognizable and can be readily implemented by those of ordinary skill in the art.

Reaction schemes to make NMC materials include:

Scheme I: Carboxylate precursors of manganese, nickel, and cobalt made from pure metal starting materials are used to make NMC. Metal carboxylate precursors include manganese citrate, manganese acetate, nickel citrate, nickel acetate, cobalt citrate, and cobalt acetate. In one aspect, the metal carboxylate precursors are made from a reaction of pure metals with a carboxylic acid. In another aspect, the metal carboxylate precursors are made from a reaction of a metal compound with a carboxylic acid. In one aspect, the metal carboxylate precursors include residual acid and/or an acid bonded to or complexed with a metal. The carboxylate precursors can be prepared separately and then combined (as slurries and/or solids) in a reaction to form a metal oxide. Alternatively, the starting materials for the different carboxylate precursors can be combined and reacted to form a metal oxide, where the carboxylate precursors form as intermediates in the reaction. In one aspect, the reaction to form a metal oxide includes ball milling. In another aspect, the reaction to form a metal oxide includes calcination.

Scheme II: Carboxylate precursors of nickel and cobalt made from metal compound starting materials and a manganese carboxylate precursor made from pure manganese metal are used to make NMC. Metal compound starting materials for nickel and cobalt include oxides, carbonates, and hydroxides. Oxides are preferred metal compound starting materials. The carboxylate precursors can be prepared separately and then combined (as slurries and/or solids) in a reaction to form a metal oxide. Alternatively, the starting materials for the different carboxylate precursors can be combined and reacted to form a metal oxide, where the carboxylate precursors form as intermediates in the reaction. In one aspect, the reaction to form a metal oxide includes ball milling. In another aspect, the reaction to form a metal oxide includes calcination.

The kinetics of solid state reaction at high temperature are closely related to the diffusion of particles. Application of heat enhances the rate of diffusion, and thus increases the rate of the reaction. High temperatures promote the formation of $Li_2MnO_3$ and a high degree of cation mixing, whereas moderate temperatures and oxidizing atmospheres favor the formation of lower cation mixing because of the stabilization of $Ni^{3+}$. Ball milling can reduce particle size and increase the efficiency of mixing, thus increasing kinetics.

Lithiation and Calcination: Formation of lithium cathode materials requires lithiation of transition metal oxide compounds made with the methods described herein. Lithiation is accomplished with a lithium precursor. A lithium precursor is a compound that includes lithium. Preferred lithium precursors include $Li_2CO_3$ and $LiOH·H_2O$. In one aspect, lithiation is accomplished by combining one or more metal precursors with a lithium precursor in a ball milling jar. A small amount of acetone or other liquid may also be added as a wetting agent to the jar because wet-milling is much more efficient than dry-milling. The resulting mixture is slowly heated to e.g. 600-950° C., and kept at that temperature for ten to twenty hours. In one aspect, calcination occurs in air. Representative calcination conditions are presented in the examples below.

During the solid-state reactions that are induced by calcination, the metal precursors decompose to form nanoparticles. An air environment controlling condition is dependent on the selection of the precursors. When metal carboxylate precursors are used in the solid state reaction, decomposition releases CO, $CO_2$, and $H_2O$. As noted above, residual nitrate groups are present in some embodiments of metal carboxylate precursor and lead to production of $NO_x$ and $O_2$ during decomposition. $NO_x$ and/or $O_2$ may react with CO. The decomposition products contain a balance of reducing and oxidizing species that inhibit oxidation of manganese to $Mn^{4+}$ or higher in the metal oxide product while also inhibiting reduction of nickel to $Ni^{2+}$ in the metal oxide product. The presence of the preferred oxidation states $Mn^{3+}$ and $Ni^{3+}$ in the metal oxide product is increased.

For nickel-rich NMC materials, high temperatures enhance the rate of the reaction, but increase the degree of cation mixing whereas moderate temperatures favor the formation of an ordered structure with less cation mixing, but this needs a prolonged reaction time. High temperatures and prolonged reaction time increase the formation of $Li_2MnO_3$. Citrates and acetates increase the atomic level connections among Ni, Mn, Co and Li cations or atoms through chelating, thereby facilitating a drastic increase in the reaction rate. The degree of interconnectedness of metal cations or atoms can be controlled through the ratio of acetate and citrate groups present in the reaction mixture (or more generally, the ratio of monodentate and multidentate groups). In one aspect, citrate (and other multidentate carboxylate) groups are capable of forming extending chains or networks that include multiple metal cations or atoms to form an interconnected structure. Acetate (and other monodentate carboxylate) groups bond to a single metal cation or atom and act to disrupt chains or extended networks to promote formation of a less interconnected structure.

The ratio of multidentate carboxylate groups (e.g. citrate) to monodentate carboxylate groups (e.g. acetate) in the reaction mixture used to form a metal precursor, mixed metal precursor or metal oxide is in the range from 0.25-2.0, or in the range from 0.50-1.5, or in the range from 0.7-1.3, or in the range from 0.85-1.2.

Metal citrates and acetates (and other metal carboxylates) decompose to form nanoparticles that can enhance the rate of diffusion. Furthermore, decomposition of carboxyl groups releases reducing gases to protect manganese from oxidizing. In order to avoid oxidizing manganese, the air flow rate should be controlled during calcinations. In addition, ball milling can reduce particle sizes, and wet milling increases the mobility of particles to enhance mixing efficiency, thereby reducing the reaction time. The synthesis conditions greatly affect the structures and performances of materials.

Metal oxides prepared from the metal precursors described herein include $Li_xNi_{1-y-z}Mn_yCo_zO_2$, where x is in the range from 0.80 to 1.3, y is in the range from 0.01 to 0.5, and z is in the range from 0.01 to 0.5; and $Li_xMn_2O_4$, where x is in the range from 0.8 to 1.3; and $Li_xNi_{1-y}Mn_yO_2$, where x is in the range from 0.8 to 1.3 and y is in the range from 0.0 to 0.8.

The present invention also provides a method for directly recovering and re-synthesizing an NMC cathode from a waste lithium ion battery, avoiding a complex separation process. In particular, the process uses a carboxylic acid to reduce manganese present in a higher oxidation state (e.g. $Mn^{4+}$) in the waste to generate new cathode material with manganese present in a lower oxidation state (e.g. $Mn^{2+}$). In more particular, the cathode can be recovered by sintering the waste in a reducing environment such as hydrogen and carbon monoxide.

Example 1. Preparation of Mixed Manganese Precursor Solution. 20.0 g crushed electrolytic Mn flakes, 20.0 g acetic acid and 20.0 g citric acid were put in a beaker. 200 ml of distilled water was gradually added. The mixture was heated at 95-100° C. until the Mn was completely reacted. The product was a liquid phase mixed manganese precursor. The final weight of the Mn precursor solution was 110.4 g (18.3 wt % Mn).

Example 2. Preparation of Nickel Acetate Precursor Solution. 394.5 g nickel balls (3-10 mm diameter), 100 ml of distilled water, 20 g aqueous $HNO_3$ (67 wt %), 15 g acetic acid and 15 g citric acid were placed in a PTFE beaker with a cap. The beaker was heated at 95-100° C. for five hours. While heating, an additional 200 ml of distilled water was gradually added to prevent the reaction mixture from drying out. Partial reaction of the nickel balls occurred during the reaction time. The unreacted portion of the nickel balls was separated from the solution and rinsed three times with 10 ml of distilled water. The rinse product was added back to the solution. The unreacted nickel balls were then further rinsed with a large amount of water and dried. The final weight of the unreacted portion of the nickel balls was 375.3 g, which means that the net nickel weight in the product nickel acetate precursor solution was 17.2 g. The final weight of the nickel precursor solution was 200.5 g (8.58 wt % of which was nickel).

Example 3. Preparation of Cobalt Acetate Precursor Solution. 209.9 g cobalt flakes, 100 ml distilled water, 17 g aqueous $HNO_3$ (67 wt %), and 20 g acetic acid were placed in a PTFE beaker with a cap. The beaker was heated at 95-100° C. for five hours. While heating, an additional 200 ml distilled water was gradually added to prevent the reaction mixture from drying out. Partial reaction of the cobalt flakes occurred during the reaction time. The unreacted portion of the cobalt flakes was separated from the solution and rinsed with 10 ml distilled water. The rinse product was added back to the solution. The unreacted cobalt flakes were then further rinsed with a large amount of water and dried. The final weight of the unreacted cobalt flakes was 193.1 g, which meant that the net cobalt weight in the cobalt acetate precursor solutions was 15.9 g. The final weight of the cobalt acetate precursor solution was 169.9 g (9.36 wt % of which was cobalt).

Example 4. Preparation of NMC622 ($LiNi_{0.6}Mn_{0.2}Co_{0.2}O_2$). 123.1 g of the nickel acetate precursor solution (Example 2), 18.0 g of the mixed manganese precursor solution (Example 1), and 37.8 g of the cobalt acetate precursor solution (Example 3) were put in a beaker with a cap. The beaker was heated at 95-100° C. for 1 hour while stirring. 14.5 g of $LiOH-H_2O$ was then added with stirring while maintaining the temperature at 95-100° C. to form a viscous slurry. The resulting slurry was dried at 130° C. overnight. The dried slurry was placed in a one-liter jar. 1 kg of a grinding medium ($ZrO_2$, average particle size 3/8") and 70 g of acetone were added to the jar. The dried slurry was then milled in the jar for 5 hours. The milled product was dried in air and loaded in a $Al_2O_3$ crucible for calcination. Calcination included increasing the temperature of the crucible from room temperature to 950° C. over a time period of 3 hours. The crucible was then held at 950° C. for 10 hours, cooled from 950° C. to 600° C. over a time period of 5 hours, kept at 600° C. for 5 hours, and then cooled to room temperature over a time period of 5 hours. The final product was ground and characterized by XRD, SEM, and electrochemical half-cell testing.

Example 5. Preparation of a Mixed Precursor for NMC532 ($LiNi_{0.5}Mn_{0.3}Co_{0.2}O_2$). 8.8 g Ni powder (with an average diameter of 3 μm-7 μm), 3.5 g Co powder (200 mesh), 4.9 g crushed Mn powder, 18.9 g citric acid and 18 g acetic acid were placed in a beaker and mixed. The metal powders had an average diameter of 3 μm-7 μm. 100 ml of aqueous $HNO_3$ solution (7 wt %) was gradually added at room temperature and the mixture was heated at 95-100° C. for 3 hours while stirring. During the 3-hour reaction time period, an additional 100 ml distilled water was added to prevent the reaction mixture from drying out. The resulting slurry was dried overnight.

Figure 3:
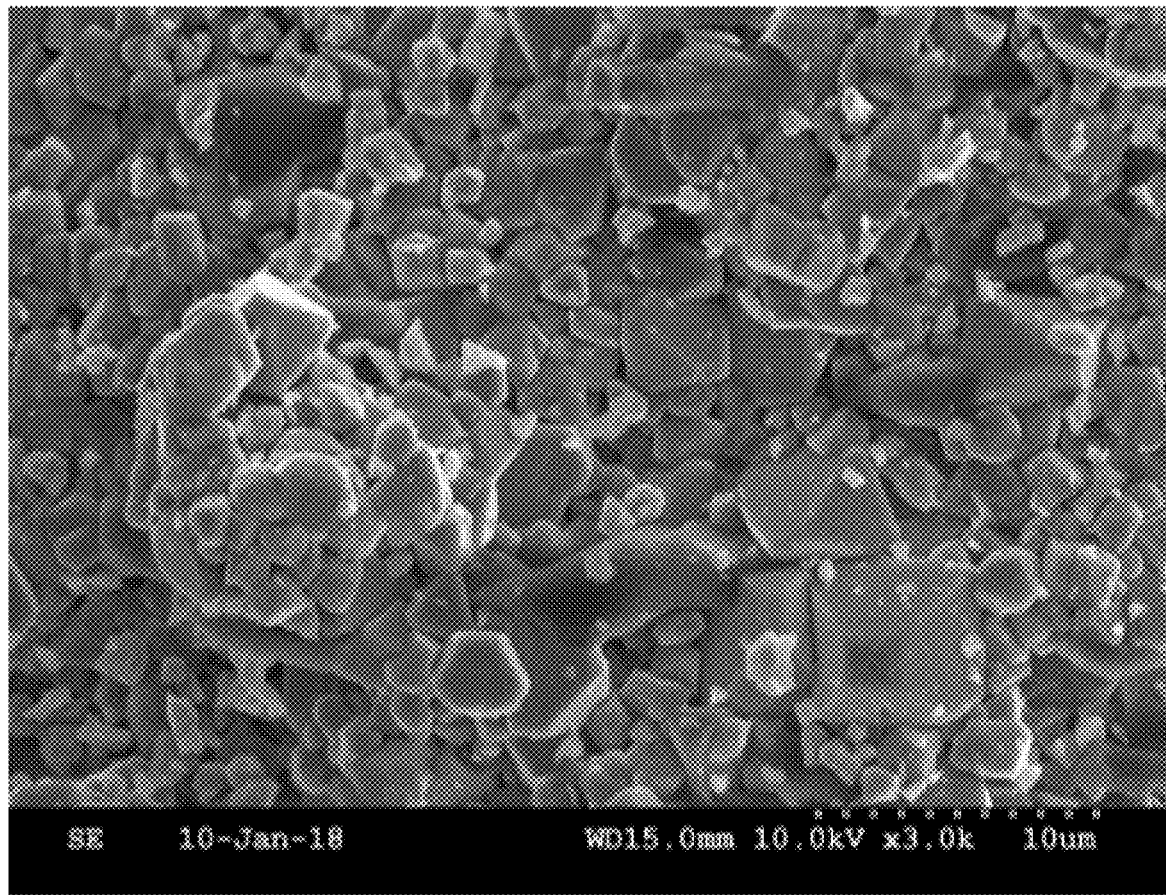
FIG. 3 shows SEM (Scanning Electron Microscope) images of $LiNi_{0.5}Mn_{0.3}Co_{0.2}O_2$ in an as prepared state.
Figure 4:
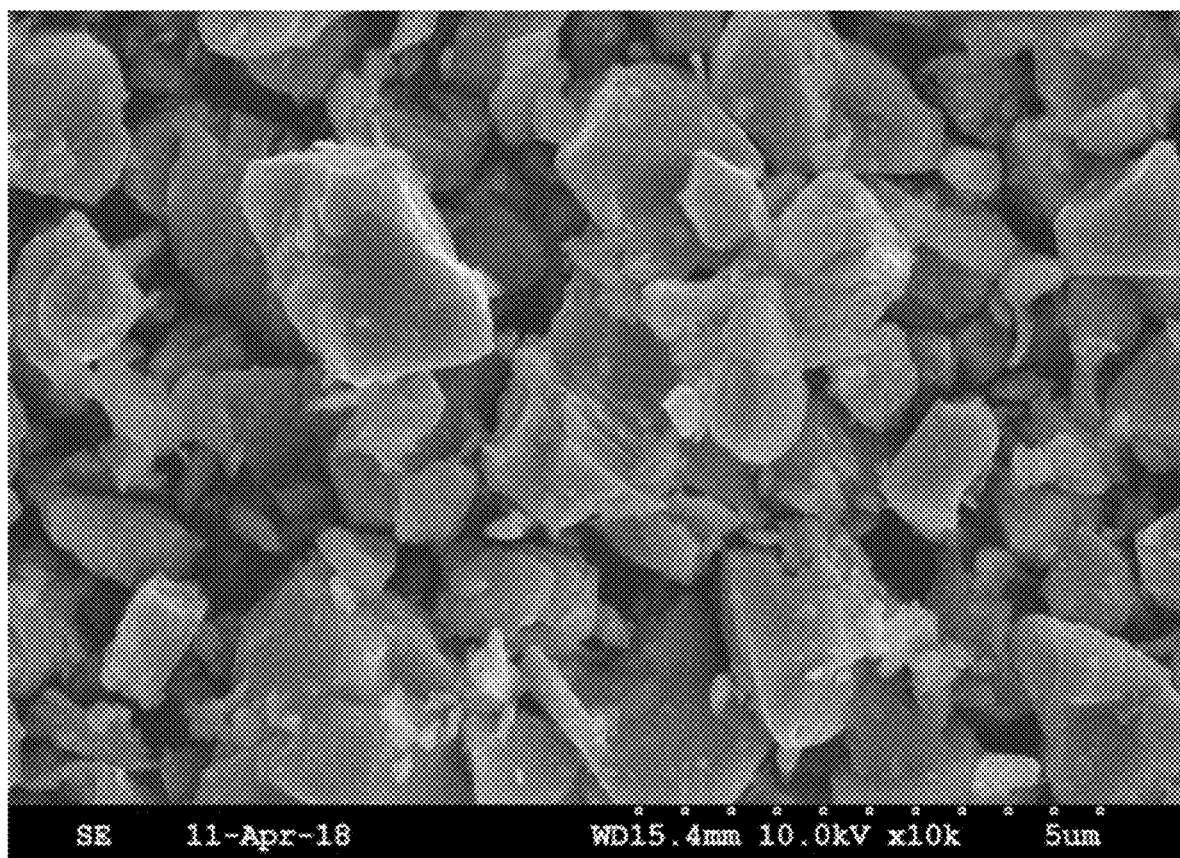
FIG. 4 shows SEM (Scanning Electron Microscope) images of $LiNi_{0.5}Mn_{0.3}Co_{0.2}O_2$ after grinding.
Figure 7:
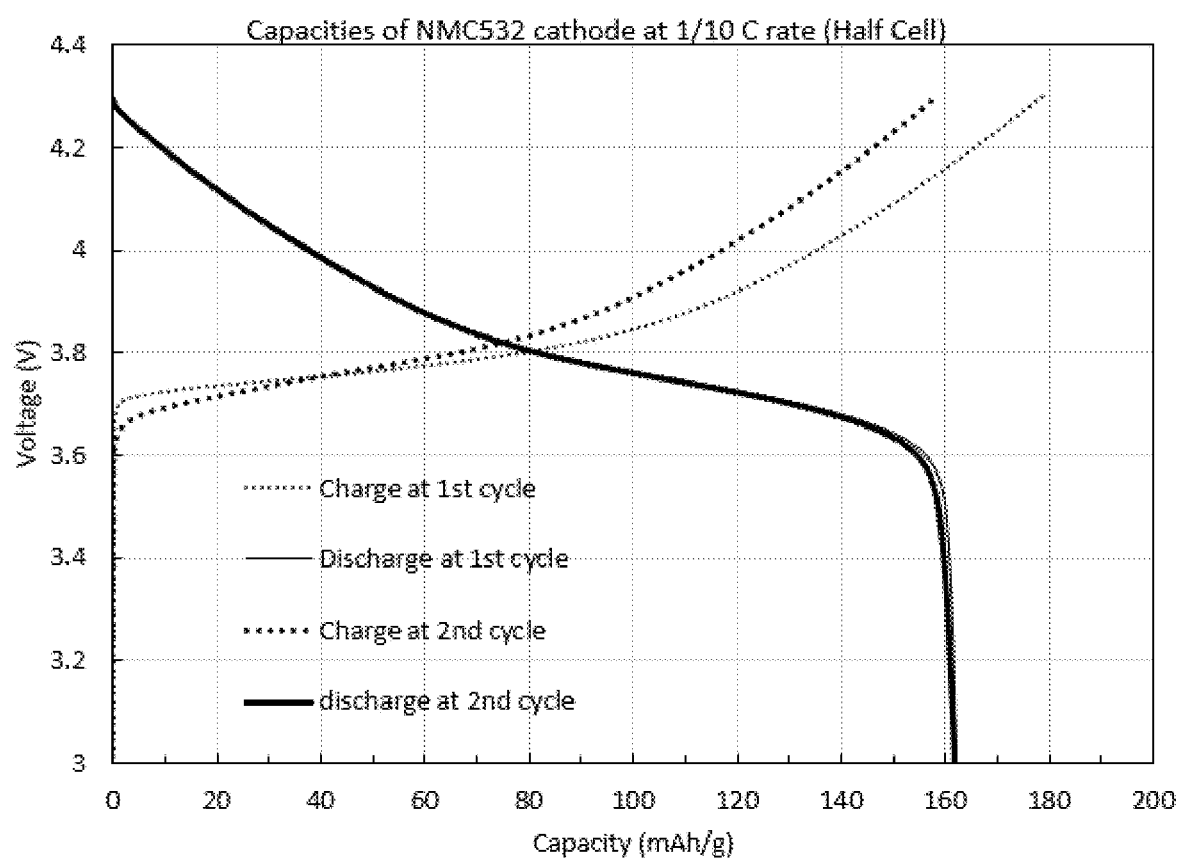
FIG. 7 shows charge and discharge capacities of $LiNi_{0.5}Mn_{0.3}Co_{0.2}O_2$.
Figure 8:
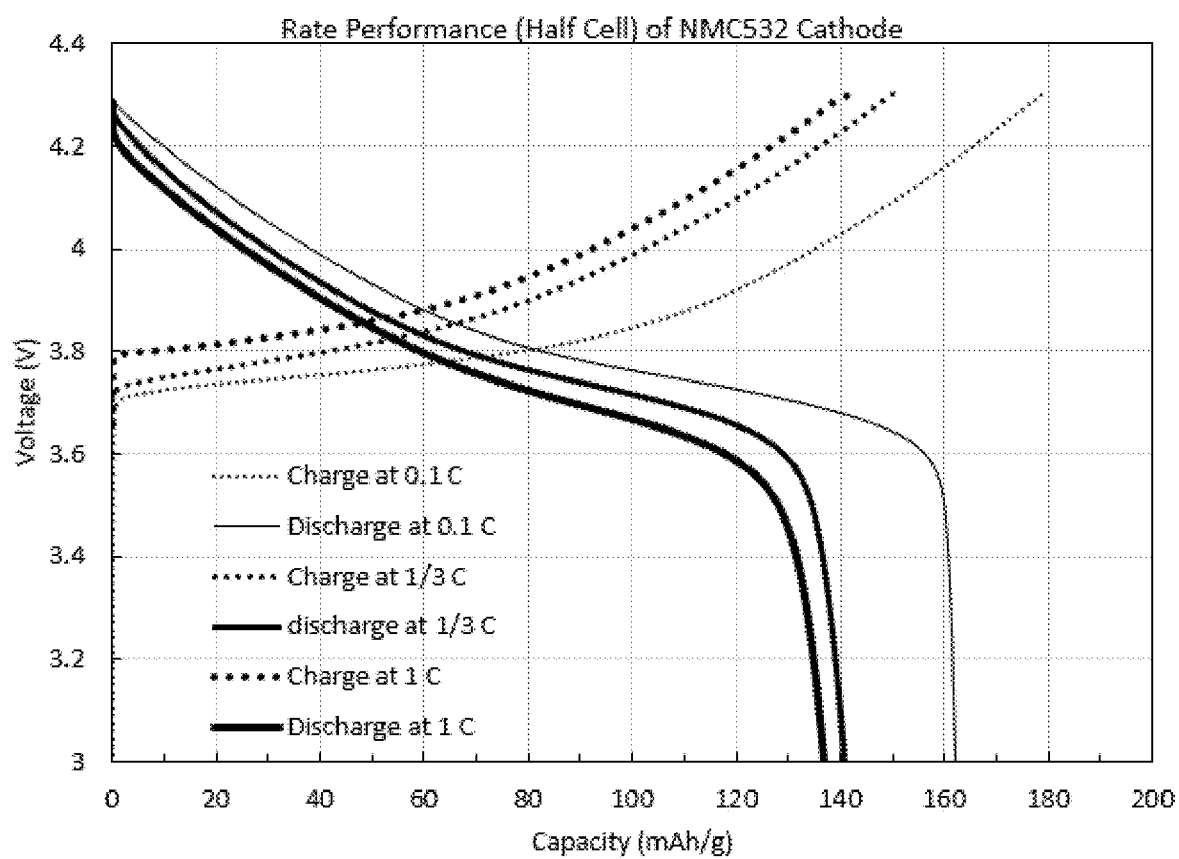
FIG. 8 shows rate performance of $LiNi_{0.5}Mn_{0.3}Co_{0.2}O_2$.

Example 6. Preparation of NMC532 ($LiNi_{0.5}Mn_{0.3}Co_{0.2}O_2$). The mixed precursor for NMC532 described in Example 5 was placed in a one-liter jar. 12.7 g $Li_2CO_3$, 1 kg of grinding medium ($ZrO_2$, average particle size 3/8") and 70 g of acetone were added to the jar. The contents of the jar were milled for 5 hours. The milled product was dried overnight in air and loaded in a $Al_2O_3$ crucible for calcination. To calcine, the crucible was heated from room temperature to 950° C. over a time period of 3 hours. The crucible was then held at 950° C. for 10 hours, cooled from 950° C. to 600° C. over a time period of 5 hours, kept at 600° C. for 5 hours, and then cooled to room temperature over a time period of 5 hours. The final product was ground and characterized by XRD (FIG. 1), SEM (FIG. 3 and FIG. 4), and electrochemical half-cell testing (FIG. 7 (charge and discharge capacity over two cycles at 0.1 C rate) and FIG. 8 (rate performance at various rates (0.1 C, 1/3 C, and 1 C)).

Example 7. Preparation of a Mixed Precursor for NMC701515 ($LiNi_{0.7}Mn_{0.15}Co_{0.15}O_2$). 12.3 g Ni powder (with an average diameter of 3 μm-7 μm), 2.7 g Co powder (200 mesh), 2.5 g crushed Mn powder, 15.0 g citric acid and 18 g acetic acid were placed in a beaker and mixed. The metal powders had an average diameter of 3 μm-7 μm. 100 ml of aqueous $HNO_3$ solution (12 wt %) was gradually added at room temperature and the mixture was heated at 95-100° C. for 3 hours while stirring. During the 3-hour reaction time period, an additional 120 ml distilled water was added to prevent the reaction mixture from drying out. The resulting slurry was dried overnight.

Figure 2:
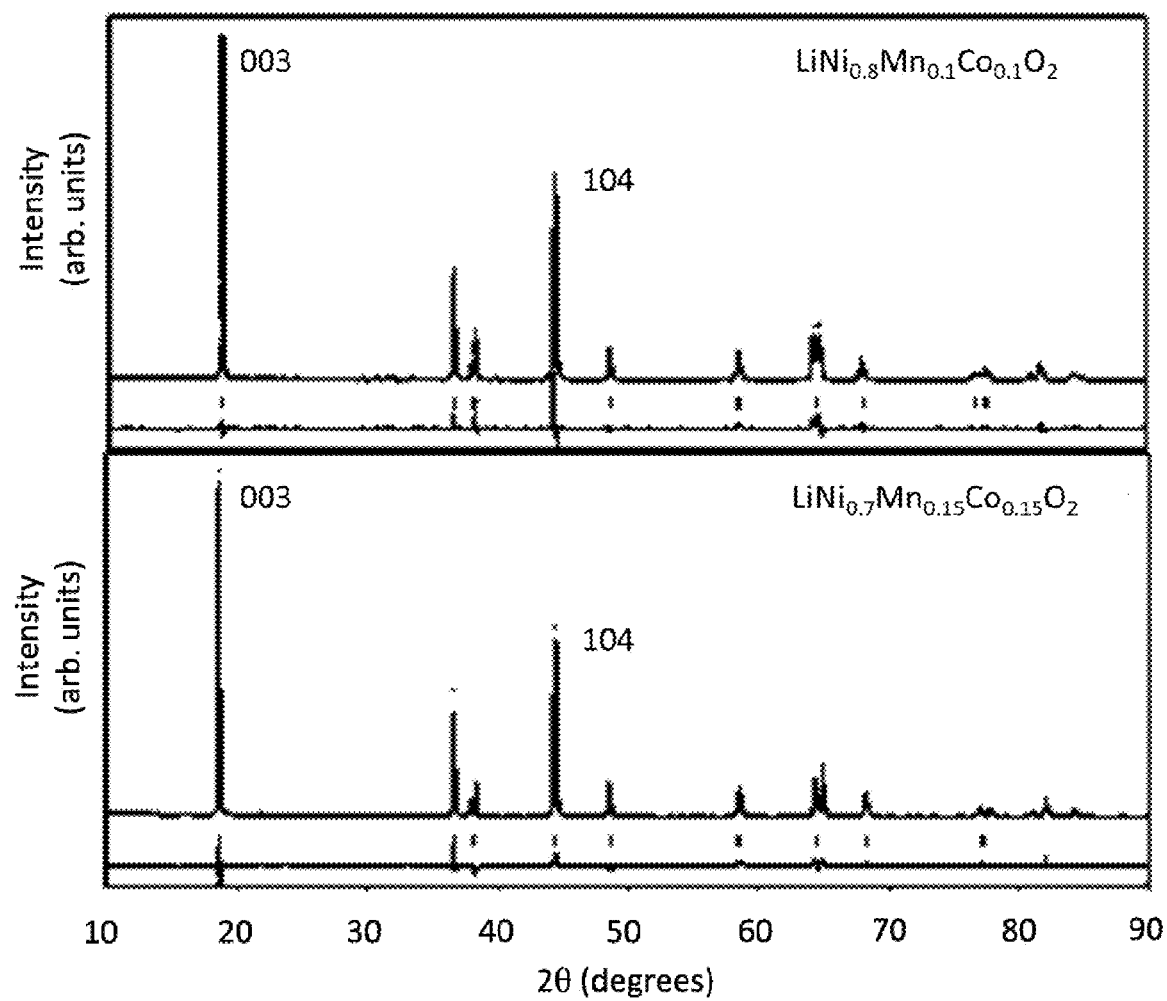
FIG. 2 shows XRD (X-ray diffraction) Rietveld refinement patterns of samples of $LiNiO_7Mn_{0.15}Co_{0.15}O_2$ and $LiNi_{0.8}Mn_{0.1}Co_{0.1}O_2$.

Example 8. Preparation of NMC701515 (LiNi$_{0.7}$Mn$_{0.15}$Co$_{0.15}$O$_2$). The mixed precursor for NMC701515 described in Example 7 was placed in a one-liter jar. 12.7 g Li$_2$CO$_3$, 1 kg of grinding medium (ZrO$_2$, average particle size ⅜") and 70 g of acetone were added to the jar. The contents of the jar were milled for 5 hours. The milled product was dried overnight in air and loaded in a Al$_2$O$_3$ crucible for calcination. To calcine, the crucible was heated from room temperature to 930° C. over a time period of 3 hours. The crucible was then held at 930° C. for 5 hours, cooled from 930° C. to 800° C. over a time period of 5 hours, kept at 800° C. for 30 hours, cooled from 800° C. to 750° C. over a time period of 2 hours, kept at 750° C. for 20 hours, cooled from 750° C. to 600° C. over a time period of 5 hours, kept at 600° C. for 5 hours, and then cooled to room temperature over a time period of 5 hours. The final product was ground and characterized by XRD (FIG. 2).

Example 9. Preparation of a Mixed Precursor for NMC811 (LiNi$_{0.5}$Mn$_{0.1}$Co$_{0.1}$O$_2$). 14.1 g Ni powder (with an average diameter of 3 μm-7 μm), 1.8 g Co powder (200 mesh), 1.6 g crushed Mn powder, 15.0 g citric acid and 18 g acetic acid were placed in a beaker and mixed. The metal powders had an average diameter of 3 μm-7 μm. 100 ml of aqueous HNO$_3$ solution (12 wt %) was gradually added at room temperature and the mixture was heated at 95-100° C. for 3 hours while stirring. During the 3-hour reaction time period, an additional 120 ml distilled water was added to prevent the reaction mixture from drying out. The resulting slurry was dried overnight.

Example 10. Preparation of NMC811 (LiNi$_{0.8}$Mn$_{0.1}$Co$_{0.1}$O$_2$). The mixed precursor for NMC811 described in Example 9 was placed in a one-liter jar. 12.7 g Li$_2$CO$_3$, 1 kg of grinding medium (ZrO$_2$, average particle size ⅜") and 70 g of acetone were added to the jar. The contents of the jar were milled for 5 hours. The milled product was dried overnight in air and loaded in an Al$_2$O$_3$ crucible for calcination. To calcine, the crucible was heated from room temperature to 930° C. over a time period of 3 hours. The crucible was then held at 930° C. for 5 hours, cooled from 930° C. to 800° C. over a time period of 5 hours, kept at 800° C. for 30 hours, cooled from 800° C. to 750° C. over a time period of 2 hours, kept at 750° C. for 20 hours, cooled from 750° C. to 600° C. over a time period of 5 hours, kept at 600° C. for 5 hours, and then cooled to room temperature over a time period of 5 hours. The final product was ground and characterized by XRD (FIG. 2).

Example 11. Preparation of a Mixed Manganese Precursor. 3.3 g Mn flakes were crushed and ground in a mortar. 3.6 g acetic acid and 3.9 g citric acid were then added with mixing. 10 ml water was gradually added during mixing to promote the reaction. The final product was a solid phase mixed Mn precursor in the form of a powder.

Example 12. Preparation of a Mixed Nickel-Cobalt Precursor. 13.9 g of Ni$_x$O (76 wt % Ni), 4.5 g of CoO, 14.4 g of acetic acid and 15.1 g of citric acid were placed in a mortar and ground for 30 min. The mixture was transferred into a container sealed with a cap and left overnight to dry.

Figure 5:
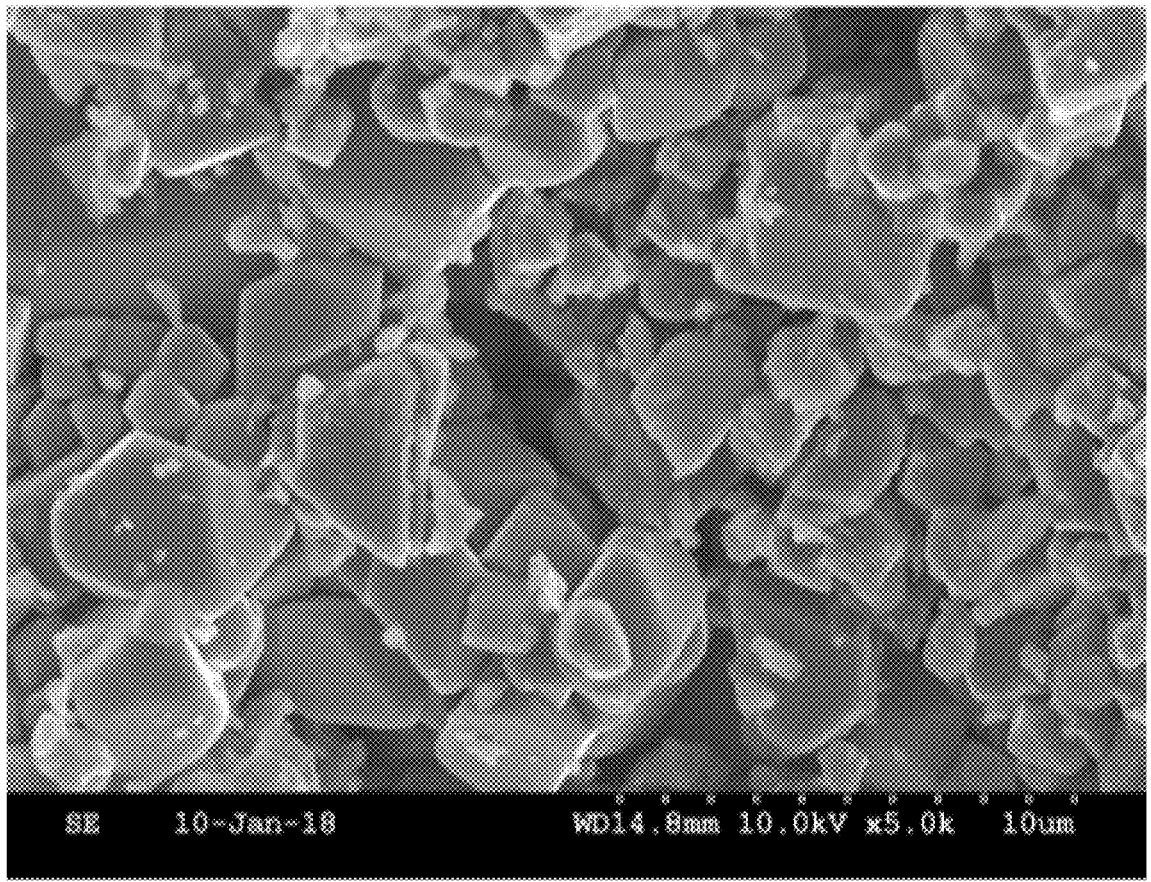
FIG. 5 shows SEM (Scanning Electron Microscope) images of $LiNi_{0.6}Mn_{0.2}Co_{0.2}O_2$ in an as prepared state.
Figure 6:
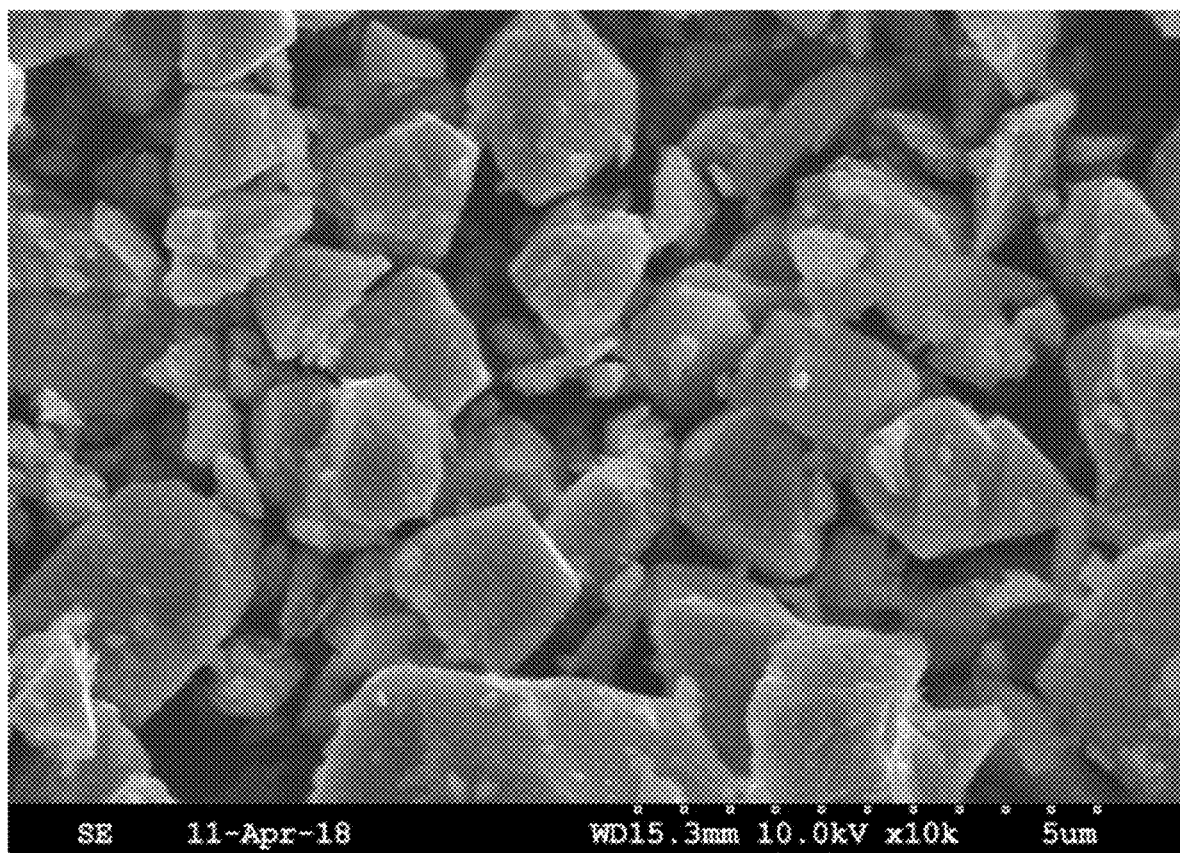
FIG. 6 shows SEM (Scanning Electron Microscope) images of $LiNi_{0.6}Mn_{0.2}Co_{0.2}O_2$ after grinding.
Figure 9:
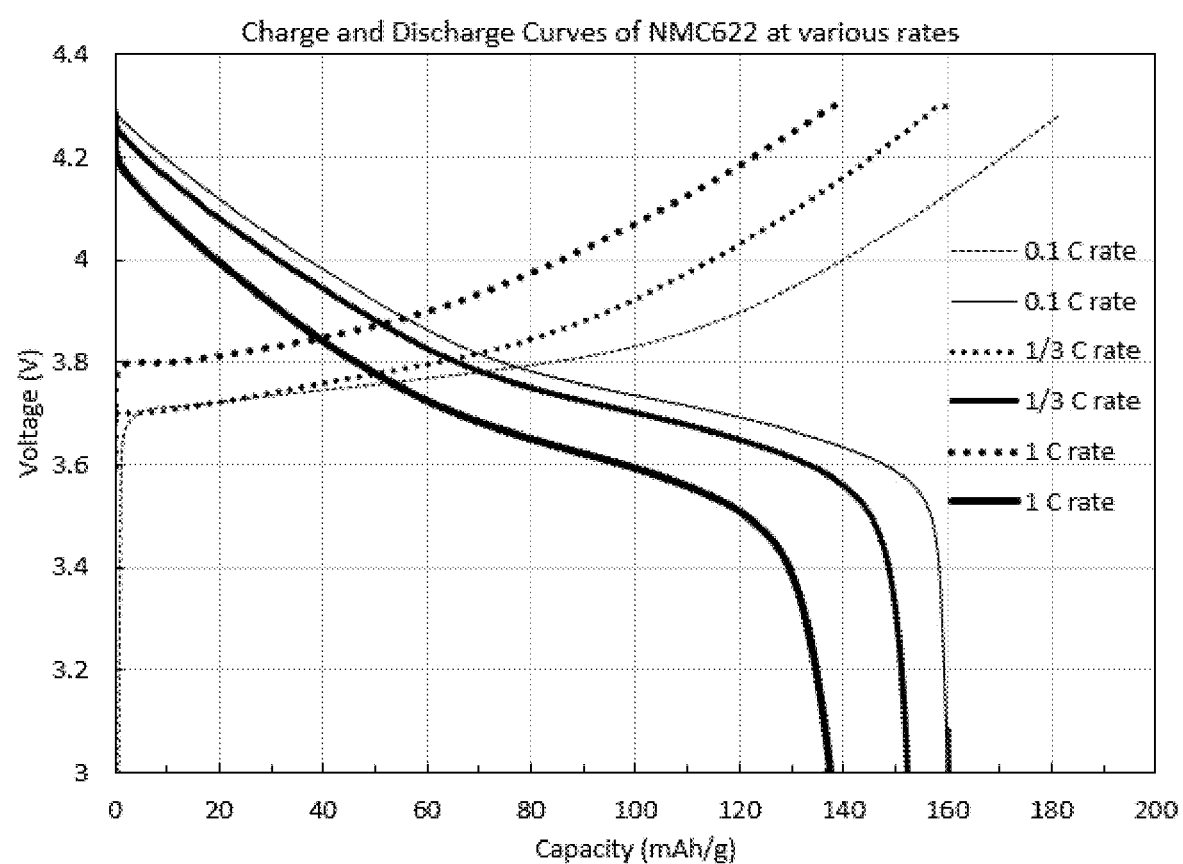
FIG. 9 shows charge and discharge capacities of $LiNi_{0.6}Mn_{0.2}Co_{0.2}O_2$.
Figure 10:
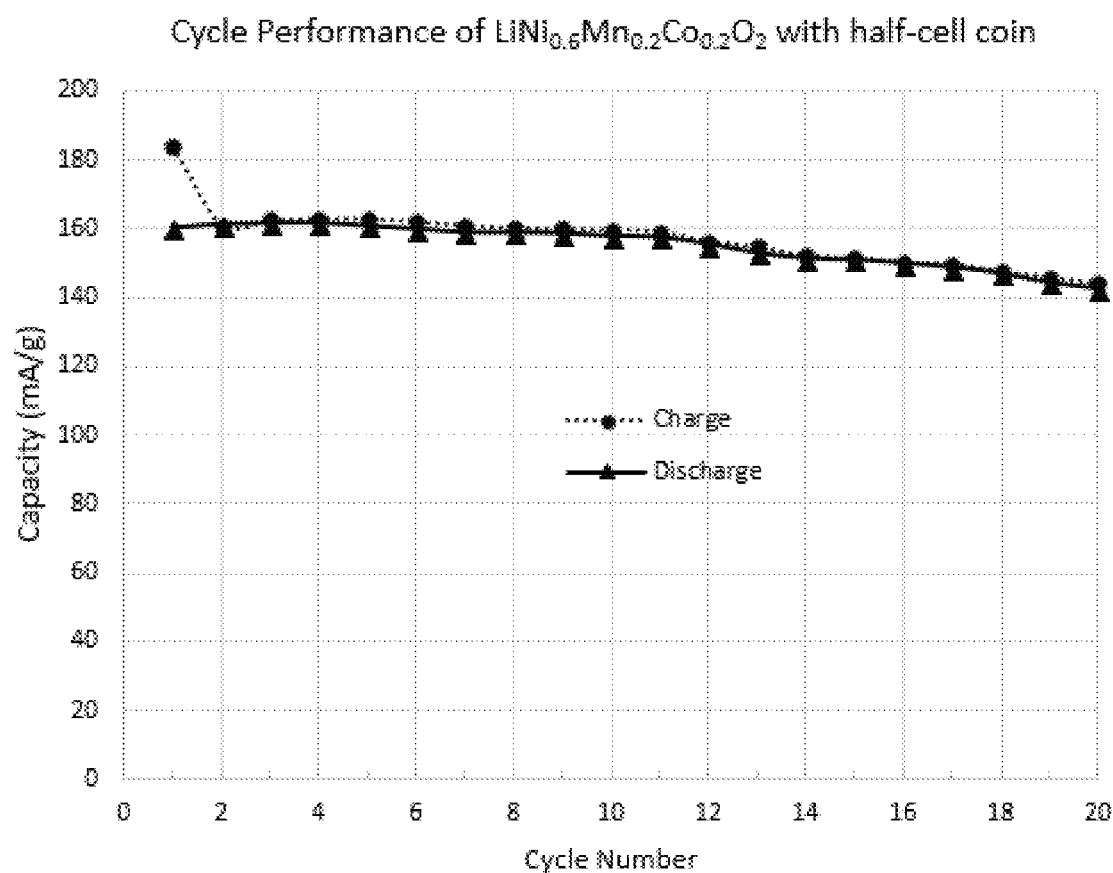
FIG. 10 shows cycle performance of $LiNi_{0.6}Mn_{0.2}Co_{0.2}O_2$.

Example 13. Preparation of NMC622 (LiNI$_{0.6}$Mn$_{0.2}$Co$_{0.2}$O$_2$). The mixed manganese precursor of Example 11, the mixed nickel-cobalt precursor of Example 12, 12.7 g of Li$_2$CO$_3$, 1 kg of grinding medium (ZrO$_2$, average particle diameter ⅜") and 70 g acetone were placed in a one-liter jar and ball-milled for 5 hours. The milled product was dried in air and loaded in a Al$_2$O$_3$ crucible for calcination. To calcine, the crucible was heated from room temperature to 950° C. over a time period of 3 hours. The crucible was then held at 950° C. for 10 hours, cooled from 950° C. to 600° C. over a time period of 5 hours, kept at 600° C. for 5 hours, and then cooled to room temperature over a time period of 5 hours. The final product was ground and characterized by XRD (FIG. 1), SEM (FIG. 5 and FIG. 6), and electrochemical half-cell testing (FIG. 9 (charge and discharge capacity at various rates (0.1 C, 1/3 C, and 1 C)) and FIG. 10 (charge-discharge performance over multiple cycles)).

Example 14. Preparation of LiNi$_{0.5}$Mn$_{0.2}$Co$_{0.2}$Fe$_{0.1}$O$_2$. This example illustrates the versatility of the method described herein for preparing new compositions for lithium ion cathode materials. In particular, this example illustrates a modified form of the NMC family of materials to include other transition metal cations. Incorporation of Fe is illustrated, but the method applies generally to other transition metals.

NMC materials with ferrous ion (Fe$^{2°}$) are difficult to synthesize with co-precipitation and other prior art methods because the presence of ferrous ion promotes cation mixing. Ferrous ion, for example, has a greater tendency to enter the planar Li$^+$ layer of the structure than nickel. With the present method, NMC materials containing ferrous ion and a low degree of cation mixing can be prepared.

Preparation of a Mixed Precursor for LiNl$_{0.5}$Mn$_{0.2}$Co$_{0.2}$Fe$_{0.1}$O$_2$). 8.8 g Ni powder (with an average diameter of 3 μm-7 μm), 3.5 g Co powder (200 mesh), 3.3 g crushed Mn powder, 1.7 g Fe powder, 18.9 g citric acid and 18 g acetic acid were placed in a beaker and mixed. The metal powders had an average diameter of 3 μm-7 μm. 100 ml of aqueous HNO$_3$ solution (7 wt %) was gradually added at room temperature and the mixture was heated at 95-100° C. for 3 hours while stirring. During the 3-hour reaction time period, an additional 100 ml distilled water was added to prevent the reaction mixture from drying out. The resulting slurry was dried overnight. 12.7 g Li$_2$CO$_3$, 1 kg of grinding medium (ZrO$_2$, average particle size ⅜") and 70 g of acetone were added to the jar. The contents of the jar were milled for 5 hours. The milled product was dried overnight in air and loaded in a Al$_2$O$_3$ crucible for calcination. To calcine, the crucible was heated from room temperature to 930° C. over a time period of 3 hours. The crucible was then held at 930° C. for 5 hours, cooled from 930° C. to 800° C. over a time period of 5 hours, kept at 800° C. for 30 hours, cooled from 800° C. to 750° C. over a time period of 2 hours, kept at 750° C. for 20 hours, cooled from 750° C. to 600° C. over a time period of 5 hours, kept at 600° C. for 5 hours, and then cooled to room temperature over a time period of 5 hours. The final product was ground and characterized by XRD (FIG. 11).

Example 15. Preparation of a Mixed Precursor for LiNi$_{0.7}$Mn$_{0.3}$O$_2$. 12.3 g Ni powder (with an average diameter of 3 μm-7 μm), 4.9 g crushed Mn powder, 15.0 g citric acid and 18 g acetic acid were placed in a beaker and mixed. 100 ml of aqueous HNO$_3$ solution (12 wt %) was gradually added at room temperature and the mixture was heated at 95-100° C. for 3 hours while stirring. During the 3-hour reaction time period, an additional 120 ml distilled water was added to prevent the reaction mixture from drying out. The resulting slurry was dried overnight. 12.7 g Li$_2$CO$_3$, 1 kg of grinding medium (ZrO$_2$, average particle size ⅜") and 70 g of acetone were added to the jar. The contents of the jar were milled for 5 hours. The milled product was dried overnight in air and loaded in an Al$_2$O$_3$ crucible for calcination. To calcine, the crucible was heated from room temperature to 950° C. over a time period of 5 hours. The crucible was then held at 950° C. for 10 hours, cooled from 950° C. to 800° C. over a time period of 5 hours, kept at 800°

Figure 12:
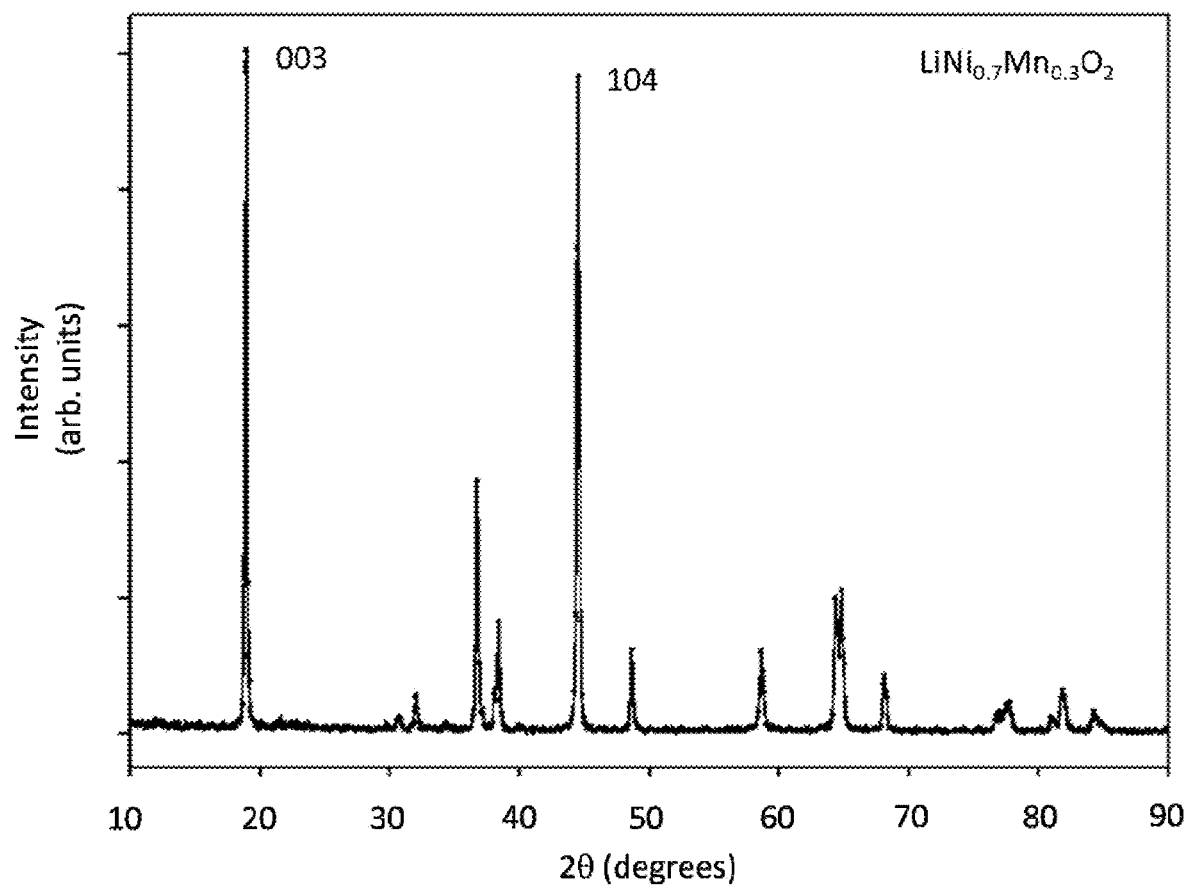
FIG. 12 shows XRD (X-ray diffraction) patterns (without Rietveld refinement) of a sample of $LiNiO_7Mn_{0.3}O_2$.

C. for 30 hours, cooled from 800° C. to 750° C. over a time period of 2 hours, kept at 750° C. for 20 hours, cooled from 750° C. to 600° C. over a time period of 5 hours, kept at 600° C. for 5 hours, and then cooled to room temperature over a time period of 5 hours. The final product was ground and characterized by XRD (FIG. 12).

Figure 11:
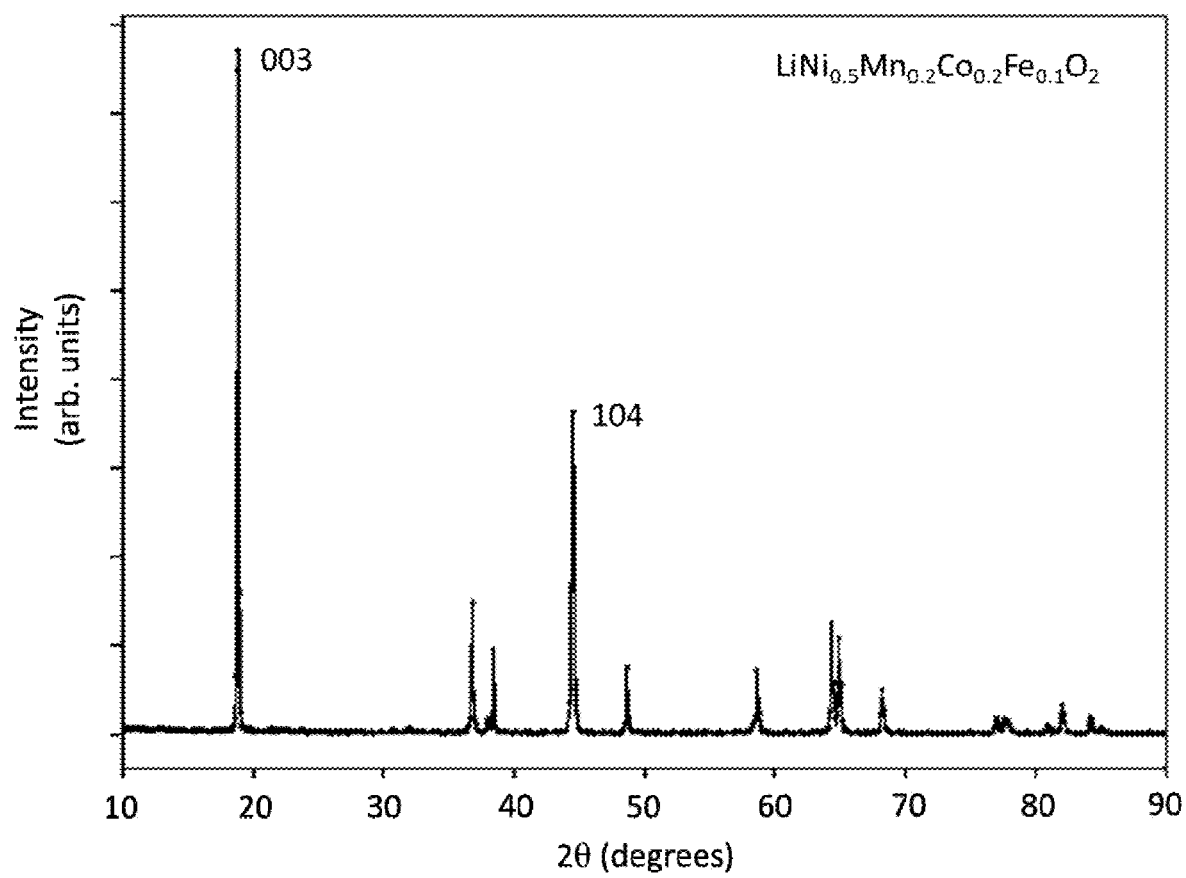
FIG. 11 shows XRD (X-ray diffraction) patterns (without Rietveld refinement) of a sample of $LiNi_{0.5}Mn_{0.2}Co_{0.2}Fe_{0.1}O_2$.

The XRD data shown in FIGS. 1, 2 and 11 indicate that the NMC products exhibit a low degree of cation mixing. Cation mixing can be the ratio of the intensity of the (003) diffraction peak ($I_{003}$) to the intensity of the (104) diffraction peak ($I_{104}$). The (003) and (104) diffraction peaks are labeled in FIGS. 1, 2, and 11. As the degree of cation mixing increases, the ratio $I_{003}/I_{104}$ decreases. A ratio $I_{003}/I_{104}$ less than 1.20 indicates a high degree of cation mixing and poor electrochemical performance of the metal oxide when used as a cathode material for lithium ion batteries. The $I_{003}/I_{104}$ ratios for the materials shown in FIGS. 1 and 2 are 1.38 ($LiNi_{0.6}Mn_{0.2}Co_{0.2}O_2$), 1.55 ($LiNi_{0.8}Mn_{0.1}Co_{0.1}O_2$), 1.86 ($LiNi_{0.5}Mn_{0.3}Co_{0.2}O_2$), and 1.87 ($LiNi_{0.7}Mn_{0.15}Co_{0.15}O_2$). Materials prepared by the methods described herein have an intensity ratio $I_{003}/I_{104}$ greater than 1.30, or greater than 1.40, or greater than 1.50, or greater than 1.60, or greater than 1.70, or greater than 1.80, or in the range from 1.35-1.95, or in the range from 1.45-1.90, or in the range from 1.55-1.85.

A first aspect of the disclosure is a method for forming an oxide material comprising:
reacting a first precursor with a second precursor, said first precursor comprising a first compound, said first compound including a first metal bonded to a first carboxylate group and a second carboxylate group, said second precursor including a second compound, said second compound including a second metal bonded to a third carboxylate group A second aspect of the disclosure is the first aspect, wherein said first carboxylate group is acetate or citrate.

A third aspect of the disclosure is the first or second aspect, wherein said second carboxylate group is citrate or acetate.

A fourth aspect of the disclosure is any of the first through third aspects, wherein said third carboxylate group is acetate, citrate, formate, propionate, oxalate, malonate, isocitrate or acontitate.

A fifth aspect of the disclosure is any of the first through fourth aspects, wherein said first metal is Ni or Co.

A sixth aspect of the disclosure is any of the first through fifth aspects, wherein said second metal is Mn.

A seventh aspect of the disclosure is any of the first through sixth aspects, wherein said third metal is Al, Fe, Cu, Zn, Ti, or Zr.

An eighth aspect of the disclosure is any of the first through seventh aspects, wherein said reacting occurs at a temperature between 600 to 950° C.

A ninth aspect of the disclosure is any of the first through eighth aspects, wherein said reacting comprises ball milling a mixture of said first precursor and said second precursor.

A tenth aspect of the disclosure is any of the first through ninth aspects, wherein said reacting produces a product comprising:

$Li_xNi_{1-y-z}Mn_yCo_zO_2$, wherein x is in the range from 0.80 to 1.3, y is in the range from 0.01 to 0.5, and z is in the range from 0.01 to 0.5.

An eleventh aspect of the disclosure is any of the first through ninth aspects, wherein said reacting produces a product comprising:

$Li_xMn_2O_4$ wherein x is in the range from 0.8 to 1.3.

A twelfth aspect of the disclosure is any of the first through ninth aspects, wherein said reacting produces a product comprising:

$Li_xNi_{1-y}Mn_yO_2$ wherein x is in the range from 0.8 to 1.3 and y is in the range from 0.0 to 0.8.

A thirteenth aspect of the disclosure is a method of making a carboxylate compound comprising:
reacting a first pure metal with a first carboxylic acid in the presence of an inorganic acid.

A fourteenth aspect of the disclosure is the thirteenth aspect, wherein said first pure metal comprises Ni, Co, or Mn.

A fifteenth aspect of the disclosure is the thirteenth or fourteenth aspect, wherein said inorganic acid is selected from the group consisting of nitric acid, hydrochloric acid, sulfuric acid, and perchloric acid.

A sixteenth aspect of the disclosure is any of the thirteenth through fifteenth aspects, wherein said inorganic acid is nitric acid.

A seventeenth aspect of the disclosure is a method of making a carboxylate compound comprising:
reacting a first metal compound with a first carboxylic acid, said reacting including ball milling a mixture of said first metal compound and said first carboxylic acid.

An eighteenth aspect of the disclosure is the seventeenth aspect, wherein said first metal compound is a metal oxide or metal carbonate.

A nineteenth aspect of the disclosure is the seventeenth or eighteenth aspect, wherein said first metal compound comprises Ni, Co or Mn.

A twentieth aspect of the disclosure is any of the seventeenth through nineteenth aspects, wherein said first metal compound is derived from a waste lithium ion battery.

Those skilled in the art will appreciate that the methods and designs described above have additional applications and that the relevant applications are not limited to those specifically recited above. Also, the present invention may be embodied in other specific forms without departing from the essential characteristics as described herein. The embodiments described above are to be considered in all respects as illustrative only and not restrictive in any manner.

What is claimed is:

1. A method for forming an oxide material comprising:
reacting a first precursor with a second precursor to form a mixed precursor, said first precursor comprising a first compound, said first compound including a first metal bonded to a first carboxylate group and a second carboxylate group, said second precursor including a second compound, said second compound including a second metal bonded to a third carboxylate group, said mixed precursor comprising said first metal, said second metal, said first carboxylate group, said second carboxylate group, and said third carboxylate group; and
reacting said mixed precursor with lithium carbonate or lithium hydroxide;
wherein said first carboxylate group differs from said second carboxylate group.

2. A method for forming an oxide material comprising:
reacting a first precursor with a second precursor to form a mixed precursor, said first precursor comprising a first compound, said first compound including a first metal bonded to a first carboxylate group and a second carboxylate group, said second precursor including a second compound, said second compound including a second metal bonded to a third carboxylate group, said mixed precursor comprising said first metal, said second metal, said first carboxylate group, said second carboxylate group, and said third carboxylate group; and reacting said mixed precursor with lithium carbonate or lithium hydroxide;

wherein said third carboxylate group differs from said first carboxylate group and said second carboxylate group.

3. A method for forming an oxide material comprising:

reacting a first precursor with a second precursor to form a mixed precursor, said first precursor comprising a first compound, said first compound including a first metal bonded to a first carboxylate group and a second carboxylate group, said second precursor including a second compound, said second compound including a second metal bonded to a third carboxylate group, said mixed precursor comprising said first metal, said second metal, said first carboxylate group, said second carboxylate group, and said third carboxylate group; and reacting said mixed precursor with lithium carbonate or lithium hydroxide;

wherein each of said first carboxylate group, said second carboxylate group, and said third carboxylate group is acetate or citrate and wherein a ratio of said citrate to said acetate is in a range from 0.25 to 2.0.

4. The method of claim 3, wherein said first carboxylate group is acetate.

5. The method of claim 4, wherein said second carboxylate group is citrate.

6. The method of claim 3, wherein said third carboxylate group is acetate, citrate, formate, propionate, oxalate, malonate, isocitrate or acontitate.

7. The method of claim 3, wherein said first metal is Ni or Co.

8. The method of claim 7, wherein said second metal is Mn.

9. The method of claim 7, wherein said second metal is Fe.

10. The method of claim 3, wherein said reacting to form said mixed precursor occurs at a temperature between 600 to 950° C.

11. The method of claim 3, wherein said reacting to form said mixed precursor comprises ball milling a mixture of said first precursor and said second precursor.

12. The method of claim 3, wherein said reacting to form said mixed precursor further comprises reacting said first precursor and said second precursor with a third precursor, said third precursor comprising a third metal bonded to a fourth carboxylate group, said reacting said mixed precursor with lithium carbonate or lithium hydroxide producing a product comprising:

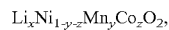
$Li_xNi_{1-y-z}Mn_yCo_zO_2,$ wherein x is in the range from 0.80 to 1.3, y is in the range from 0.01 to 0.5, and z is in the range from 0.01 to 0.5.

13. The method of claim 3, wherein said reacting to form said mixed precursors produces a product comprising:

$Li_xMn_2O_4$ wherein x is in the range from 0.8 to 1.3.

14. The method of claim 3, wherein said reacting to form said mixed precursors produces a product comprising:

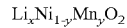
$Li_xNi_{1-y}Mn_yO_2$ wherein x is in the range from 0.8 to 1.3 and y is in the range from 0.0 to 0.8.

15. The method of claim 3, wherein the ratio of said citrate to said acetate is in a range from 0.7 to 1.3.

16. The method of claim 3, wherein said first metal differs from said second metal.

17. The method of claim 12, wherein said product has an x-ray diffraction spectrum with an intensity ratio $I_{003}/I_{104}$ greater than 1.30.

18. The method of claim 3, wherein said reacting said mixed precursor with lithium carbonate or lithium hydroxide further comprises reacting said mixed precursor with a third precursor, said third precursor comprising a third metal bonded to a fourth carboxylate group, said reacting said mixed precursor with lithium carbonate or lithium hydroxide producing a product comprising:

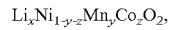
$Li_xNi_{1-y-z}Mn_yCo_zO_2,$ wherein x is in the range from 0.80 to 1.3, y is in the range from 0.01 to 0.5, and z is in the range from 0.01 to 0.5.

* * * * *